United States Patent [19]

MacKay

[11] Patent Number: 5,236,149
[45] Date of Patent: Aug. 17, 1993

[54] BOUNDARY LAYER CONTROL DEVICE FOR TILT ROTOR CONFIGURATION

[75] Inventor: James K. L. MacKay, Columbus, Ohio

[73] Assignee: Rockwell International Corporation, Seal Beach, Calif.

[21] Appl. No.: 956,824

[22] Filed: Oct. 5, 1992

Related U.S. Application Data

[63] Continuation of Ser. No. 693,251, Apr. 29, 1991, abandoned.

[51] Int. Cl.⁵ .................. B64C 29/00; B64C 23/08
[52] U.S. Cl. ....................... 244/7 C; 244/206; 244/215
[58] Field of Search ............... 244/198, 206, 10, 244/214, 215

[56] References Cited

U.S. PATENT DOCUMENTS

| | | | |
|---|---|---|---|
| 2,094,105 | 9/1937 | Myers | 244/7 R |
| 3,092,354 | 6/1963 | Alvarez-Calderon | 244/206 |
| 3,106,369 | 10/1963 | Borst | 244/7 R |
| 3,121,544 | 2/1964 | Alvarez-Calderon | 244/206 |
| 3,179,354 | 4/1965 | Alvarez-Calderon | 244/7 C |
| 3,586,262 | 6/1971 | Sherman | 244/7 R |

FOREIGN PATENT DOCUMENTS

| | | | |
|---|---|---|---|
| 592655 | 2/1960 | Canada | 244/206 |
| 0416590 | 3/1991 | European Pat. Off. | 244/7 R |

*Primary Examiner*—Galen Barefoot
*Attorney, Agent, or Firm*—Terrell P. Lewis; Charles T. Silberberg

[57] ABSTRACT

A boundary layer control device including a rotating cylinder mounted on a shaft disposed along the trailing edge of the wing of an aircraft and a flap structure secured to the shaft on which the rotating cylinder is mounted. In the preferred embodiment, the flap structure is coupled to the shaft by brackets, each of which having one end pivoted about the shaft and an opposite end to which the flap is pivotally supported. This arrangement facilitates rotation of the flap structure between a first "cruise" position in which the flap structure is disposed substantially horizontally at the trailing edge of the wing, and a second "VTOL" position in which the flap is disposed either above or below the wing in a "stowed" or aerodynamically hidden position. Various other embodiments are disclosed.

14 Claims, 6 Drawing Sheets

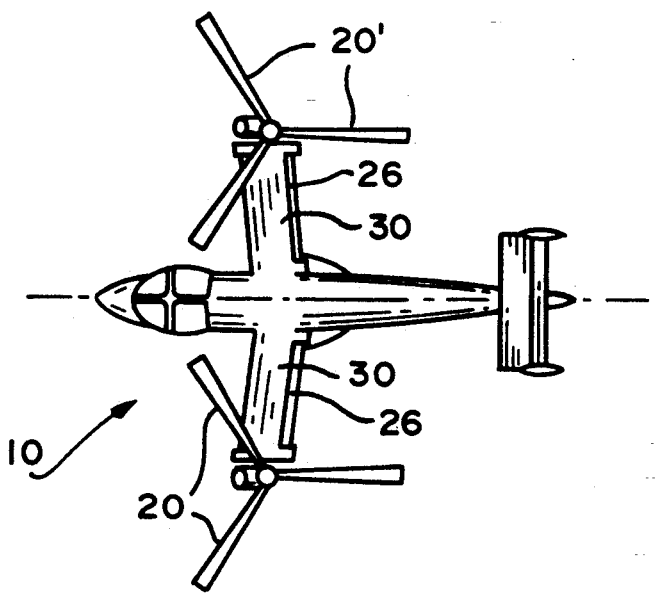
FIG. 1
(PRIOR ART)
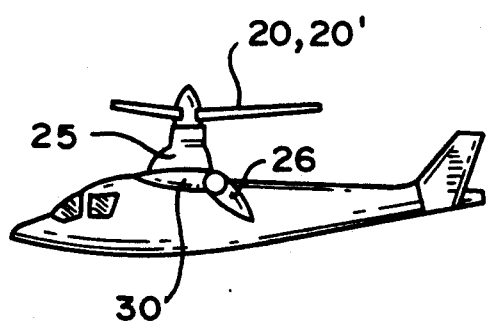
FIG. 2
(PRIOR ART)
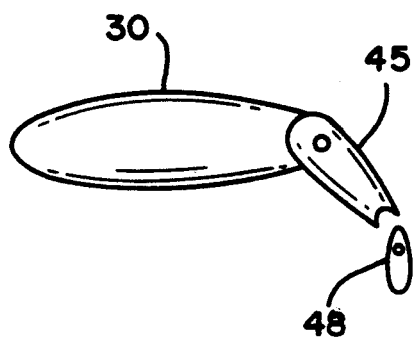
FIG. 3
(PRIOR ART)
FIG. 4
(PRIOR ART)
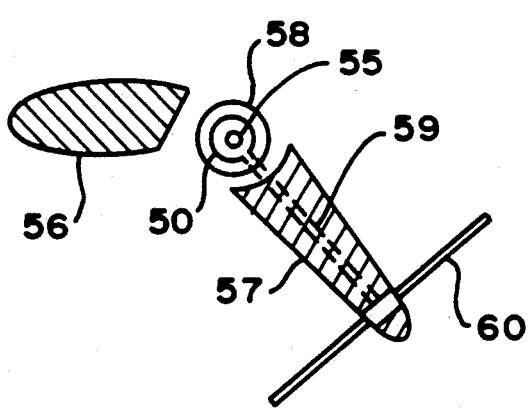
FIG. 5
(PRIOR ART)

BOUNDARY LAYER CONTROL DEVICE FOR TILT ROTOR CONFIGURATION

This is a continuation of copending application(s) Ser. No. 07/693,251 filed on Apr. 29, 1991 now abandoned.

BACKGROUND OF THE INVENTION

1. Field of the Invention

The present invention relates to boundary layer control devices for use with VTOL or STOL aircraft, and more particularly to boundary layer control devices mounted on the wings of VTOL and STOL aircraft for minimizing the separation of layers of air flowing over airfoil surfaces of the wing.

2. Description of the Prior Art

One of the more critical aerodynamic considerations in the design of VTOL and STOL aircraft is the behavior of the flow of air over the lift- generating surfaces of these aircraft. FIGS. 1 and 2 of the accompanying drawings present two views of a typical VTOL/STOL aircraft 10 showing rotors 20, 20' mounted on the wings 30 at a location near the wingtips. The position of the rotors 20,20' shown in the Figures is one associated with a VTOL (i.e., for "take-off", "landing" or "hovering") mode of operation. When the aircraft is operating in a "cruise" mode, each respective rotor and engine housing 25 will have been pivoted through an angle of about 90° to a position where the axis of rotation of the rotors is substantially horizontal and parallel to the longitudinal axis of the aircraft fuselage.

Early attempts to minimize the resistance of air flowing over aircraft lift surfaces, in particular wing surfaces in STOL aircraft, resulted in structure such as that illustrated in FIG. 3 of applicant's drawings. As seen, the conventional primary flap 45 is combined with a secondary trim flap 48. The primary flap is pivotally connected to the wing 30 for rotation between a first position in which the longitudinal axis of the wing and primary flap are substantially coincident, and a second position in which the longitudinal axes of the wing and the primary flap are disposed at a maximum angle of about 45°. The secondary trim flap 48 is pivotally connected to the primary flap, and appears to enjoy a similar range of movement relative to the primary flap, so that when the primary and secondary flaps are in their second positions, the secondary flap and the wing make an angle of about 90°.

NASA Report No. TM 84401, entitled "AIRLOADS ON BLUFF BODIES, WITH APPLICATION TO THE ROTOR-INDUCED DOWNLOADS ON TILT-ROTOR AIRCRAFT", authored by W. J. McCroskey et al., discusses the problems associated with a slightly different form of the same problem, i.e., the impingement of the wake of a lifting rotor on a horizontal surface, such as a wing, fuselage or control surface. The conclusion of the report is that this airflow denigrates the lifting capabilities of the aircraft in hover and low-speed flight. Such vertical drag phenomenon, also known as "download", is particularly important for tilt-rotor configurations since both the downwash velocities of the rotors and the affected wing area are larger than for conventional helicopters. The NASA Report presents evidence which indicates that minimum download does not occur when the wing flaps of the aircraft ar fully deflected so as to present minimum wing surface area to the rotor downwash, but rather when the flaps are deflected only approximately 60°. This behavior, it is surmised, is caused by flow separation on the upper surface of the flaps, and such flow separation might be minimized by maintaining the wing flaps at the optimum angle of about 60° (see, for example, the disposition of flap 26 relative to wing 30 in FIGS. 2 and 4 of applicant's drawings).

Through various testing, it has also been determined that download can be minimized through the use of flap and "rotating cylinder" boundary layer control devices. These mechanisms, which contribute to diminishing flow separation of air passing over the trailing and/or leading surfaces of the airfoil, comprise a rapidly rotating cylindrical or tubular element disposed at the edge of the airfoil (generally at the trailing edge) married via appropriate linkage or couplings with the pivoting flap.

Typically the rotating cylinder boundary layer control device s coupled with or incorporates the drive shaft interconnecting the rotors supported on each of the wings of the aircraft. A power source carried by the aircraft causes the drive shaft, and hence the rotating cylinder, to rotate at high speeds. Typically, the rotating cylinder is driven in rotation at speeds of from about 6,000 RPM to about 9,700 RPM, and tests conducted by NASA have demonstrated that a cylinder speed of about 7,500 RPM will prevent separation of the airflow from the airfoil surfaces.

One of the earliest examples of a rotating cylinder boundary layer control device which combines a "pivoting flap" is disclosed in U.S. Pat. No. 3,179,354 to Alvarez-Calderon, and is shown schematically in FIG. 5 of applicant's drawings. In the illustrated configuration, a rotating cylinder is provided which spans the length of each of the wings and extends along their trailing edges. The apparatus is coupled to, and supported by, the fixed portion of each of the aircraft wings (shown in cross-section as element 56) and includes a pivotally mounted "flap" 57 on each of the wings. A shaft 55 defines a pivot axis for the "flap", and a rotating cylinder 58 extends across the entire span of each of the wings and rotates about the pivot axis. The "flap" consists of a pivoting wing portion which carries one or more engine-driven rotors 60. The shaft which defines the pivot axis transmits power from a remote power source (e.g., an internally housed engine) to a propeller drive element 59 (shown in phantom in FIG. 5) by means of a gear box 50. The propeller drive element in turn causes rotation of the rotors which, in the Alvarez-Calderon aircraft, are pusher propellers. These pusher propellers are pivotally movable from a location below the wing in the "VTOL" mode of operation and behind the wing in the "cruise" mode of operation. The flap and propeller shaft are designed to pivot approximately 90° from the "cruise" position to the "VTOL" position.

The boundary layer control device of Alvarez-Calderon appears to have been the first meaningful solution to the nagging problem of controlling, if not minimizing, rotor downloading in VTOL aircraft. Nevertheless, this solution was only of limited utility in a configuration where the rotor is above the wing n the "VTOL" mode. The propulsion mechanism used by the patentee was that of a pusher propeller, not a tractor propeller, so that the source of fluid from which the airflow over the wing and flap was derived encompassed all fluid in the ambient. Moreover, the location of the propulsion mechanism relative to the aircraft's fixed wings was rearwardly or below in the Alvarez-Calderon aircraft depending on the mode of operation, rather than forwardly or above as in the more conventional configurations known today.

Therefore, it appears that the patentees never addressed the problem of rotor downwash caused by direct impingement of rotor-driven fluid on the wing or flap of a VTOL/STOL aircraft. While the Alvarez-Calderon invention was a significant step forward in improving the performance of VTOL aircraft, it is clear that the patentee neither understood, nor recognized, the problem of rotor download on the wings or flaps of VTOL/STOL aircraft.

The tilt rotor aircraft configuration taught by the Alvarez-Calderon patent, in which the VTOL rotors are of the push propeller type supported on a flap pivotally mounted to and depending beneath the wing, is fundamentally different from the more conventional tilt rotor aircraft as taught by the present invention which has its VTOL rotor(s) disposed above the wing.

In the configuration of Alvarez-Calderon (FIG. 6), the cross flow (.e., the air flow shown by lines A passing across the top of the wing or flap 56) is of relatively low velocity and the flow past the bottom of the wing is induced by the propeller located below the wing. At the trailing edge of the wing, the cross flow is assisted by the rotating cylinder 58, while the trailing edge "flap" has only been turned 90 degrees from the otherwise horizontally directed "cruise" position.

In contrast, in the configuration of the present invention (FIG. 7), the rotor is above the wing 30, and the cross flow A is of high velocity. In this case, it is important to turn the flow around the trailing edge with the rotating cylinder 38 so the negative pressure will be reduced on the underside of the wing. To do this, the rotating cylinder is exposed to the cross flow so that its surface velocity is 2 to 4 times that of the cross flow and the trailing edge flap is disposed so a not to impede the flow around the edge of the wing. Presumably, a rotating cylinder on the leading edge would also improve the cross flow of air over the wing; especially in the VTOL mode o operation.

OBJECTS OF THE PRESENT INVENTION

It is therefore an object of the present invention to provide boundary layer control apparatus useful with VTOL/STOL aircraft which overcomes all the disadvantages and shortcomings of the known boundary layer control apparatus used with aircraft of the same type, whereby "download" is effectively minimized.

Another object of the present invention is to provide boundary layer control apparatus for use with tilt rotor aircraft wherein the apparatus increases the pressure on the bottom of the wing when the aircraft is in the VTOL mode so that "download" on the aircraft wing is effectively reduced.

Still another object of the present invention is to provide boundary layer contol mechanisms which can be used with tilt-rotor VTOL/STOL aircraft wherein the mechanisms can be moved between a first retracted position useful for take/off and landing operation, and a second extended position useful in a cruise mode of operation.

Yet another object of the invention is to provide a boundary layer control mechanism useful in the operation of tilt-rotor VTOL/STOL aircraft comprising a stowable flap having at least one surface for redirecting the rotor downwash more closely over the wing surface during take/off and landing operation whereby "downwash" is minimized and lift is maximized.

These and other objects and advantages are attained through the use of a boundary layer control apparatus provided in accordance with the present invention wherein a rotating cylinder is structurally combined with an articulating flap mechanism, and the cylinder and flap apparatus then is marred with each of the rotor-supporting wings of a tilt-rotor VTOL/STOL aircraft. More particularly, the boundary layer control apparatus of the present invention comprises a rotating cylinder mounted on a shaft disposed along one of the leading or trailing edges of the aircraft wing, and a flap secured to the shaft on which the rotating cylinder is mounted, where the shaft is coupled to the rotating cylinder.

A first embodiment of the flap includes a triangular portion which is pivotally mounted, via brackets, to the shaft, between a first extended position for use during a "cruise" mode of operation of the aircraft, and a second stowed position for use during "lift-off" or "landing" modes of operation. The flap includes a major surface which, in the stowed position, is positioned in facing adjacency to a major surface of the wing to which the flap is connected. A second embodiment of the flap embraces an intermediate member pivotally interconnecting the triangular portion with the shaft so as to present a "double-jointed" connection between the flap and the rotating cylinder. A third embodiment of the flap includes a plate-like member which translates between a first stowed position wherein it is disposed beneath the trailing region of the wing when the aircraft is in its "take-off" or "landing" modes of operation and a second extended position wherein it is disposed rearwardly of the rotating cylinder when the aircraft is in its "cruise" mode of operation. Various other embodiments are disclosed, including one in which a flap member is pivotally attached to a track member for movement between a first operative "cruise" position in which the flap is positioned rearwardly of the rotating cylinder, and a second operative "stowed" position in which the flap pivots about an axis formed by the track member and is disposed forwardly and below the rotating cylinder.

BRIEF DESCRIPTION OF THE DRAWINGS

These and other objects and features of the invention will become more apparent from a reading of the following description of this invention when considered with the embodiments illustrated in the accompanying drawings, in which:

FIGS. 1 and 2 are top and side schematic views, respectively, illustrating a conventional VTOL/STOL rotor-driven aircraft and generally showing the most desirable location for a boundary layer control device of the type to which this invention relates;

FIG. 3 shows one early attempt to control the flow of air over an aircraft lift-generating surface, such as a wing;

FIG. 4 shows an early embodiment of a boundary layer control device (disclosed in NASA Report No. TM 84401, discussed above), and used to minimize flow separation over lift-generating surfaces encountered n rotor "download" conditions., FIG. 5 illustrates a well-known boundary layer control device used with STOL/VTOL aircraft, namely the rotating cylinder and flap device taught by U.S. Pat. No. 3,179,354 to Alvarez-Calderon;

DETAILED DESCRIPTION OF THE INVENTION

Basically, there are four types of propeller/rotor driven propulsion systems used in VTOL/STOL aircraft. First, there is the "deflected slipstream system", n which a propeller that is mounted ahead of a fixed wing has its slipstream deflected downwardly by a flap. Second, there is the "tilt-wing system", in which the propellers are mounted ahead of a wing that tilts with respect to the fuselage. A third type is the configuration of Alvarez-Calderon in which the propellers are mounted below the wing for inducing flow of air past the wing. Finally, there is the "tilt-rotor system", in which the propellers are mounted on pivots such that the rotors and engines together tilt with respect to the wings.

The boundary layer control apparatus encompassed by the present invention has been particularly designed for use with tilt-rotor propulsion systems where rotor downwash over the wing surface directly behind the rotor is a major contributor to diminishing the lifting capabilities of the system. In an aircraft with a tilt-rotor system, the rotors pivot through a range of angles, but principally move between a first "take-off" or "landing" position in which the plane of rotation of the rotor tips is substantially horizontal, and a second "cruise" position in which the plane of rotation of the rotor tips is substantially vertical. Generally, the boundary layer control apparatus used with these systems is provided adjacent one surface of the wing (in most cases, the trailing surface or edge), and in the preferred embodiment of the invention is used in combination with the existing wing flaps. Of course, the invention also contemplates the use of the boundary layer control apparatus disclosed herein in lieu of the wing flaps of an aircraft.

The rotating cylinder is a recognized boundary layer flow control device which reenergizes the boundary layer and helps the flow negotiate turns and delay separation. For most effective use, the rotating cylinder should protrude through the boundary layer and its perimeter should rotate at three to four times the local free stream velocity. The flap part of this boundary layer control device is useful for reducing the drag in conventional flight and for assisting STOL operation of the aircraft. In applying the flap part of the boundary layer control device to the tilt rotor concept in the VTOL mode, the present invention contemplates folding of the flap to improve the flow to the bottom of the wing. Various embodiments for accomplishing this result are disclosed herein.

Figure 7:
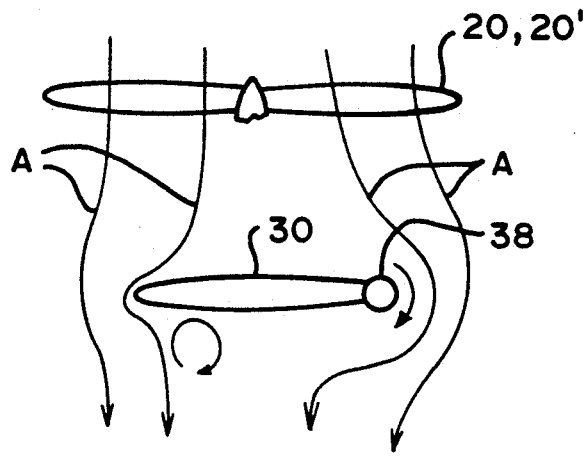
FIG. 7 is a schematic side sectional representation of the configuration of the present invention with the rotor in a position associated with the "VTOL" mode of operation.
Figure 6:
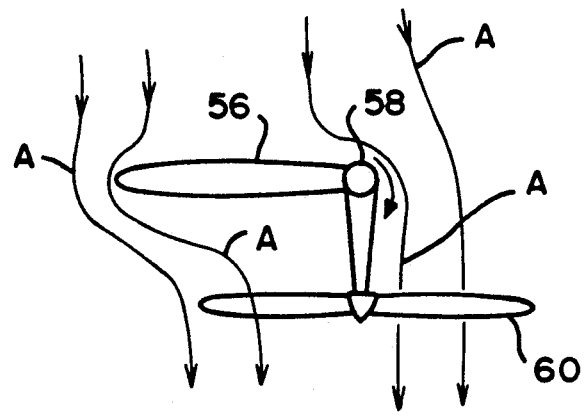
FIG. 6 is a schematic side sectional representation of the Alvarez-Calderon configuration with the rotor in a position associated with the "VTOL" mode of operation.
Figure 8:
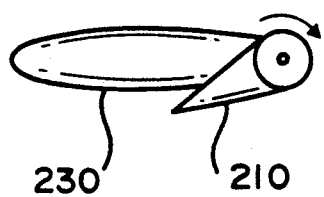
FIGS. 8 and 9 depict a first embodiment of the boundary layer control apparatus intended for use with tilt-rotor aircraft in accordance with the present invention.
Figure 9:
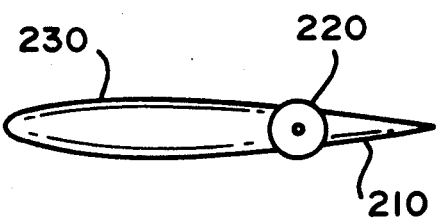

Referring now to FIGS. 8 and 9 of the drawings, there is shown a first embodiment of the boundary layer control apparatus contemplated by the present invention. This apparatus essentially comprises a structural arrangement very similar to that taught by Alvarez-Calderon, namely a flap member 210, a rotating cylinder 220 and the aircraft wing 230. FIG. 8 illustrates the relative position of the wing, the flap member and rotating cylinder when the aircraft is in its "VTOL" mode of operation, while FIG. 9 shows the relative positions of the flap member, the cylinder and the wing when the aircraft is in its "cruise" mode of operation. The flap member is pivotally attached to the wing 230 via a shaft (not shown, but contained within the rotating cylinder 220). The cylinder 220 is driven in rotation via appropriate gearing and linkages coupling it with the aircraft powerplant. The direction of rotation of the cylinder is one which complements the direction of airflow over the upper surface of the wing, i.e., if the airflow over the wing leaves the trailing edge of the wing, then the cylinder is driven in rotation in a clockwise direction. This similarity of direction assists in holding the stream of air flowing over the wing surface in conformance with (or at least as close thereto as possible) the outer periphery of the wing.

The most notable conceptual distinction between this (and each following) embodiment of the present invention and the boundary layer control devices known in the prior art is that the flap in this embodiment is aerodynamically "hidden" with respect to the rotor downwash when the aircraft is in its "VTOL" mode of operation. That is, the flap member (as seen in FIG. 8) is pivoted through an angle of more than 90° relative to its position in the "cruise" orientation shown in FIG. 9. The effect of this is to eliminate the interference of the flap member with the stream of air flowing around the edge and under the surface, of the wing, which might otherwise take place if the flap member were disposed n the path of the airflow.

Figure 10:
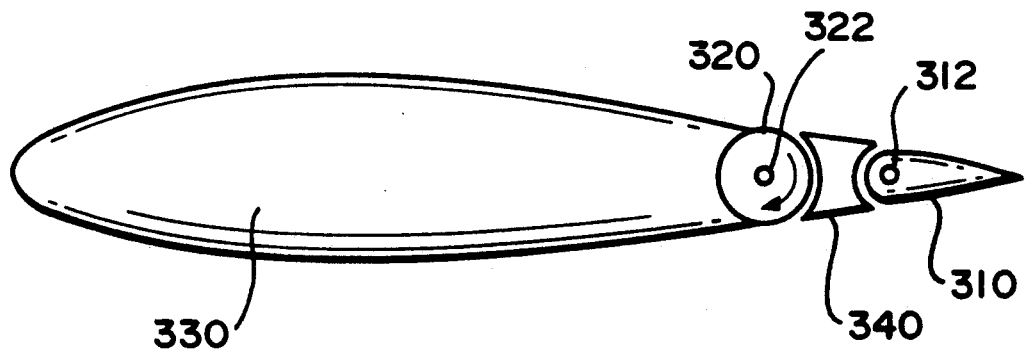
FIGS. 10-12 illustrate a second embodiment of the boundary layer control apparatus in accordance with the present invention.
Figure 11:
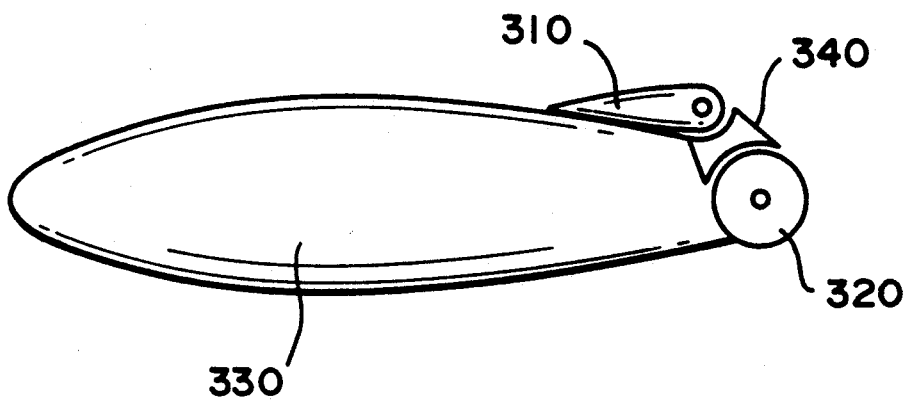
Figure 12:
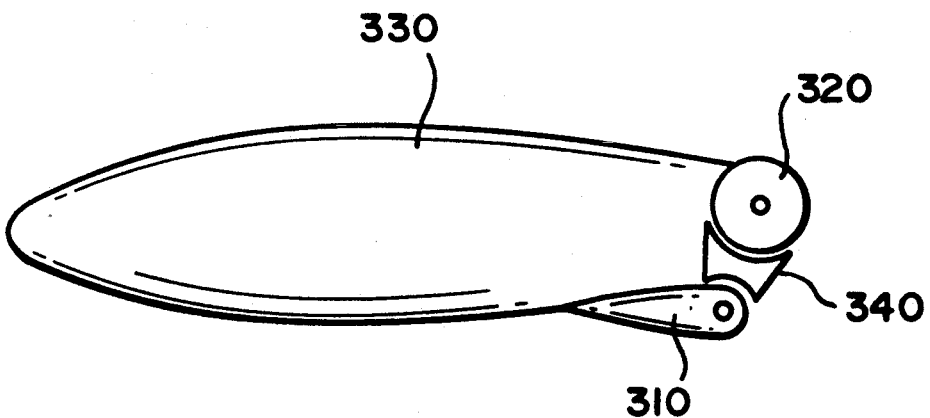

A second embodiment of the invention is depicted in FIGS. 10-12. In FIG. 10, the wing 330 is provided with boundary layer control apparatus comprising the rotating cylinder 320 and the flap member 310. As in the previous embodiment, cylinder 320 rotates in a clockwise direction, so as to prevent separation of airflow past the wing trailing edge. Disposed between, and coupling, the shaft 322 about which the cylinder 320 is driven in rotation and the flap member 310 is an interconnecting member 340. The flap member, which in FIG. 10 is shown disposed in a "cruise" position, is pivotally connected to the interconnecting member at a mutually carried pivot 312. FIGS. 11 and 12 show alternate positions for the flap member 310 when the boundary layer control apparatus is functioning in the "VTOL" position. In FIG. 11, the flap member is rotated from its position of FIG. 10 to a position where it is disposed above the rotating cylinder and where one major surface of the flap member is positioned adjacent the upper major surface of the wing. In FIG. 12, the flap member is rotated from its position of FIG. 10 to a position where it is disposed below the rotating cylinder and where one major surface of the flap member is positioned adjacent the lower major surface of the wing.

Figure 13:
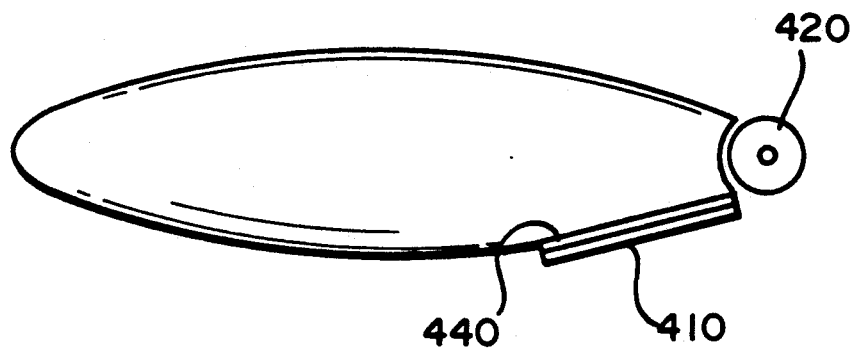
FIGS. 13 and 14 illustrate a third embodiment of the boundary layer control apparatus in accordance with the present invention.
Figure 14:
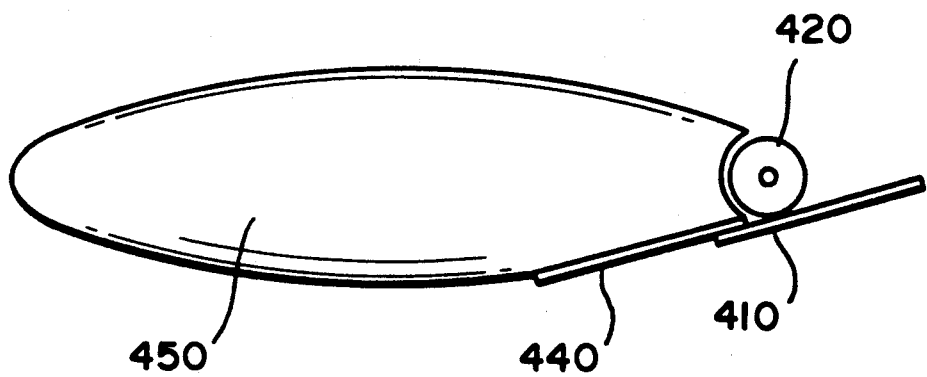

FIGS. 13 and 14 show a third embodiment of the boundary layer control apparatus encompassed by the present invention, wherein the apparatus comprises a rotating cylinder 420 and a flap member 410. As seen in the Figures, the flap member is mounted on a plurality of substantially parallel track members 440 which interconnect the flap member with the wing 430 and which permit translation of the flap member between the "stowed" position of FIG. 13 in which the flap member is disposed substantially below the wing with a major surface of the flap member positioned adjacent the lower major surface of the wing, and the extended "cruise" position of FIG. 14 in which the flap member is disposed substantially above and behind the wing.

Figure 15:
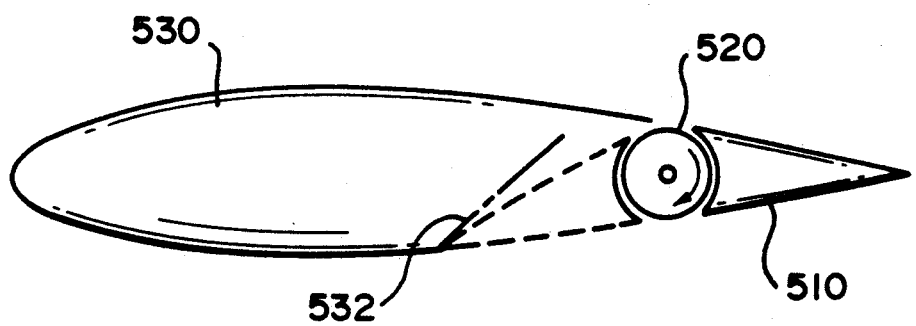
FIGS. 15-17 illustrate a fourth embodiment of a boundary layer control apparatus in accordance with the present invention.
Figure 16:
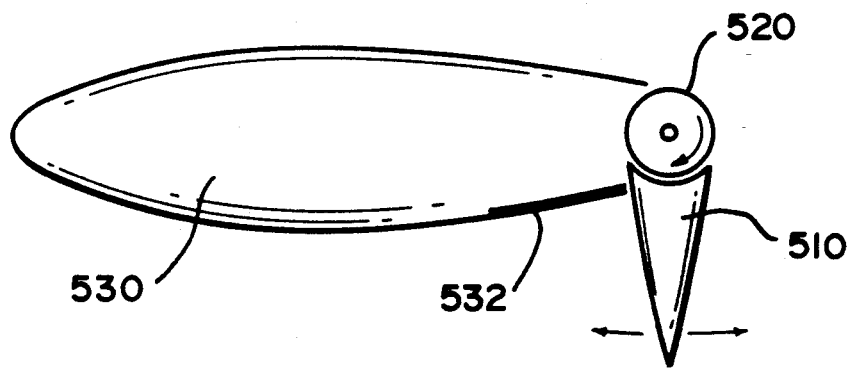
Figure 17:
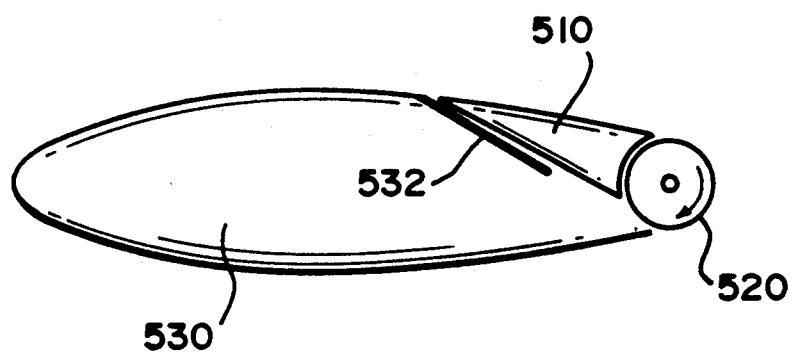

FIGS. 15–17 show a fourth embodiment of the boundary layer control apparatus of the present invention, where the components of the apparatus include a flap member 510, a rotating cylinder 520 and a compartment in the wing into which the flap member may be "stowed" when the aircraft is operating in its "VTOL" mode of operation. As shown in FIG. 15, the portion of the wing 530 located in the vicinity of the rotating cylinder is provided with an enclosure having a closable door which when closed forms the undersurface of the wing. When the aircraft is to be operated in the "VTOL" mode of operation, the door 532 is moved inwardly by appropriate control mechanisms to provide access to the enclosure in the lower portion of the wing, and the flap member is rotated about pivot 512 in a clockwise direction out of the "cruise" position and into a "stowed" position within the enclosure as shown in FIG. 16. The surface of the flap member which is then exposed to the ambient (i.e., the lower surface of the flap member) thereafter maintains continuity of the lower surface of the wing. FIG. 17 shows an alternate arrangement for stowing the flap member in the wing, where the enclosure is provided in the top region of the wing adjacent the rotating cylinder. The flap member is moved from the "cruise" position of FIG. 15 to the "stowed" position of FIG. 17 by pivoting the flap member in a counterclockwise direction up and over the rotating cylinder and into the enclosure provided in the wing. Once the flap member is snugly positioned in the enclosure, continuity of the upper surface of the wing is maintained by the outer exposed surface of the flap member.

Figure 18:
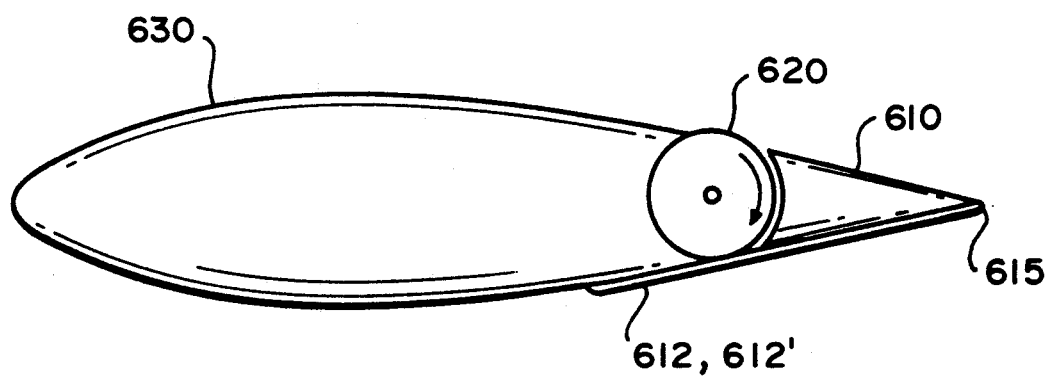
FIGS. 18-20 illustrate a fifth embodiment of a boundary layer control apparatus in accordance with the present invention.
Figure 19:
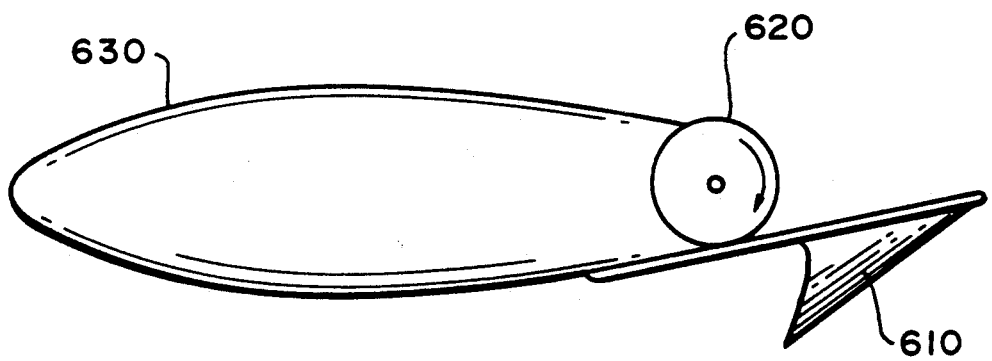
Figure 20:
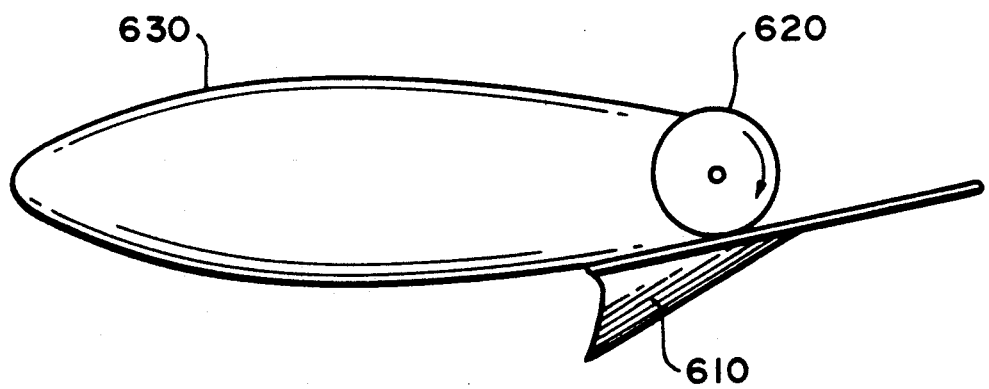

FIGS. 18–20 illustrate a fifth embodiment of the present invention in which the boundary layer control apparatus comprises a rotating cylinder 620 and a flap member 610 in combination with wing 630. As shown in FIG. 18, the flap member is provided with a plurality of sections each of which is supported on the underside of the wing by laterally disposed, parallel track members 612, 612' (only one of which is shown), the latter being secured to the wing underside in some conventional manner. Motive means (not shown, but contained in the wing) drives the flap sections in unison between one or the other of the two extreme positions shown in FIGS. 18 and 20. In FIG. 18, the flap members are positioned such that they are aerodynamically visible, i.e., aerodynamically functional, as would be necessary when the aircraft is operating in a "cruise" mode of operation. In FIG. 20, the flap members are positioned such that they are aerodynamically hidden or invisible when the aircraft is operating in a "VTOL" mode of operation. Each track member includes a pivot 615 at an outer end thereof, and thus the pivots on each pair of track members define a pivot joint for the flap member positioned therebetween. By appropriate linkages, connections, couplings, etc., the design, manufacture and arrangement of which would be within the level of skill of an ordinary mechanic, the flap members and pivot joints are coupled to the motive means mentioned above such that when the flap members are driven from their aerodynamically hidden position as shown in FIG. 20 outwardly and from beneath the wing to their aerodynamically visible position as shown in FIG. 19, the pivot joints are actuated and the flap members are synchronously pivoted from the position below the track members as shown in FIG. 19 to the position above the track members as shown in FIG. 18.

Various further modifications and alterations from those described hereinabove can obviously be made without departing from the spirit of this invention. In view of the foregoing it is apparent that there has been provided, in accordance with the invention, a boundary layer control apparatus for minimizing, if not eliminating, rotor downwash when used with tilt-rotor VTOL aircraft, which fully satisfies the objectives, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the scope of the appended claims.

What I claim as my invention:

1. Boundary layer control apparatus for use with wing members of a tilt-rotor VTOL aircraft, comprising:

a cylindrical body supported for rotation on each wing of the aircraft and extending along a major portion of the lateral extent of each said wing, said cylindrical body being continuously driven in rotation about an axis which extends substantially parallel to said lateral extent of said wing, and flap means coupled to each said wing and including means for moving said flap means relative to said rotatable cylindrical body between a substantially horizontally disposed first position in which said flap means is "aerodynamically visible" when said aircraft is operative in a "cruise mode", and a second position in which said flap means is disposed in an "aerodynamically hidden" position when said aircraft is operating in a "VTOL" mode, said flap means, in said "aerodynamically hidden" position, being disposed such that one surface thereof is substantially superimposed over an "aerodynamically hidden" surface of said wing.

2. A boundary layer control apparatus for influencing lift over an aircraft wing immersed in a fluid flow, said apparatus comprising:

a cylindrical body extending along the trailing edge of each said wing, said body being continuously subjected to said fluid flow and supported for rotation about an axis extending substantially parallel to said wing trailing edge, a flap coupled to each said wing for movement between a first "aerodynamically visible" position in which the flap is disposed downstream of said cylindrical body and is aerodynamically immersed in said fluid flow, and a second "aerodynamically hidden" position in which the flap is substantially shielded from said fluid flow, and means, carried by each of said wings, for urging said flap to and from said first and second positions.

3. The boundary layer control apparatus of claim 2, wherein said urging means includes means for operatively coupling said flap means and said rotating cylindrical body with the output of a power plant for the aircraft.

4. The boundary layer control apparatus of claim 2, and further including housing means carried by said wing and having an "aerodynamically hidden" position, said flap means including a movable flap which is driven from said first position into said second position and within said housing means.

5. The boundary layer control apparatus of claim 4, wherein said housing means is contained within said wing.

6. The boundary layer control apparatus of claim 5, wherein said housing means is contained within the lower region of said wing.

7. The boundary layer control apparatus of claim 4, wherein said housing means comprises a bracket mounted at the lower side of said wing, and said flap is supported by said bracket for reciprocating movement between said first and second positions.

8. The boundary layer control apparatus of claim 7, wherein said reciprocating movement consists of linear movement.

9. The boundary layer control apparatus of claim 7, wherein said reciprocating movement consists of pivoting movement.

10. The boundary layer control apparatus of claim 7, wherein said reciprocating movement is compound movement comprising linear and pivoting movement.

11. The boundary layer control apparatus of claim 7, wherein sad second position of said flap means is located forwardly of said rotatable cylindrical body.

12. The boundary layer control apparatus of claim 2, wherein said urging means includes bracket means rotatable about said axis of said wing about which said cylindrical body is supported.

13. The boundary layer control apparatus of claim 12, wherein said bracket means includes a pivot axis about which said flap moves to reach its first "aerodynamically visible" and its second "aerodynamically hidden" positions.

14. The boundary layer control apparatus of claim 2, and further including articulated bracket means for interconnecting said flap with said axis about which said cylindrical body rotates.

* * * * *